United States Patent

Larabell et al.

[19]

[11] Patent Number: 6,047,379
[45] Date of Patent: Apr. 4, 2000

[54] INFORMATION BUS REGENERATOR

[75] Inventors: Henri J. Larabell, San Jose, Calif.; Kevin Kiesselbach, 779 Knoll Dr., San Carlos, Calif. 94070

[73] Assignees: Henri Larabell, San Jose; Kevin Kiesselbach, San Carlos, both of Calif.

[21] Appl. No.: 08/991,993

[22] Filed: Dec. 17, 1997

[51] Int. Cl.[7] .............................. G06F 1/26; G06F 13/40; H01P 1/24
[52] U.S. Cl. ........................... 713/300; 326/30; 710/101; 307/66
[58] Field of Search ............................ 713/300; 710/100, 710/101, 2; 307/66; 326/86, 30; 333/22 R; 361/683; 327/530

[56] References Cited

U.S. PATENT DOCUMENTS

| | | | |
|---|---|---|---|
| 4,015,147 | 3/1977 | Davidson et al. | 327/566 |
| 4,604,689 | 8/1986 | Burger | 364/200 |
| 5,208,562 | 5/1993 | Schirm, IV | 333/22 R |
| 5,337,413 | 8/1994 | Lui et al. | 395/275 |
| 5,495,584 | 2/1996 | Holman, Jr. et al. | 395/308 |
| 5,577,205 | 11/1996 | Hwang et al. | 395/200.01 |
| 5,596,757 | 1/1997 | Smith | 395/750 |
| 5,680,065 | 10/1997 | Park | 326/86 |
| 5,754,868 | 5/1998 | Yamamoto et al. | 713/300 |
| 5,864,715 | 1/1999 | Zani et al. | 710/63 |

*Primary Examiner*—Gopal C. Ray
*Attorney, Agent, or Firm*—Douglas A. Chaikin; Peninsula IP Group

[57] ABSTRACT

A bus regenerator, and an extended bus information system and method of communicating information, using such a regenerator. A bus regenerator has first and second information buses. A processor is connected to transfer information between the buses and at least one terminator is connected to terminate one of the buses (preferably a terminator is provided for each bus). A termination power line supplies termination power to the terminator and power to the processor. Additionally, a rechargeable power source, particularly a rechargeable battery, is connected to the termination power line, so as to supply power to at least one of the terminator and the processor, and recharge from the termination power line, as total power used by the terminator and processor varies.

33 Claims, 10 Drawing Sheets

INFORMATION BUS REGENERATOR

FIELD OF THE INVENTION

This invention relates to computer information buses which are terminated using termination power, and the regeneration of such buses particularly with format conversion.

BACKGROUND OF THE INVENTION

A standard information bus used in current computer systems for connecting computers and peripheral devices is the Small Computer System Interface ("SCSI"). A single SCSI bus can generally support up to seven peripheral devices on an 8 bit bus, and up to fifteen on an 16 bit bus, in addition to the host. The host is typically a personal computer or workstation, and the peripheral devices can include equipment such as auxiliary information storage devices (e.g. a hard disk drive or tape storage devices), CD-ROM drivers, and the like, as well as other computers. SCSI can be implemented using both single-ended or differential drivers and receivers, and in both a standard (8 bit) and a wide (16 bit) formats. SCSI bus protocols are set out in detail in ANSI specification X3.131-1986 for SCSI I; X3-131-1994 SCSI II, and in this application "SCSI I" or "SCSI II" refers to buses meeting at least the foregoing respective specifications (whether for single-ended or differential configurations), respectively, unless a contrary intention appears. Those references and all other references cited herein are incorporated in this application by reference.

Figure 1:
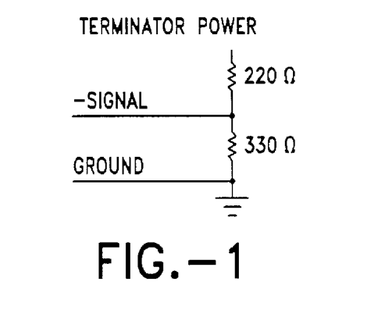
FIGS. 1 and 2 illustrate typical prior art passive bus line termination configurations for single-ended and differential bus configurations, respectively, as discussed above.
Figure 2:
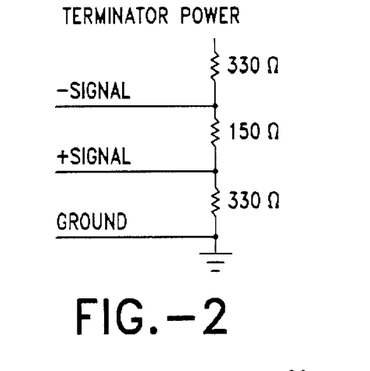

The SCSI bus includes a set of conductive lines which carry the information signals. Signals that travel on the bus between devices have wave-like properties. As a result, signals that come to an end of the bus can be reflected back along the bus and interfere with other transmitted signals and possibly corrupt information carried by the bus. To maintain characteristic impedance to reduce reflections on the bus, it is well known to terminate each end of the bus using either active or passive termination. For this purpose, the SCSI bus also carries a conductive line (referenced as "TERMPWR") to convey termination power between terminators on different devices. Each information carrying line or control signal line is generally terminated using a suitable resistor configuration in a manner such as shown in FIG. 1 for a single-ended configuration, or in a manner such as shown in FIG. 2 for a differential configuration, or by using active equivalents. For an SCSI bus, such terminator configurations generally require about 5 volts at 1 amp to operate. Again, this power is provided typically from the host device through a TERMPWR line.

An SCSI bus has a maximum recommended length of about 6 meters for a single ended configuration, and up to 25 meters for a high-powered differential configuration. Beyond the maximum recommended lengths signal degradation becomes significant with increased possibility of errors. Of course, bus repeater configurations supported by motherboards, such as that described in U.S. Pat. No. 4,604,689, can be used to extend the distance over which a signal can be transmitted. However, such configurations are inconvenient in that they require relatively complex intermediate devices supported by on-board power supplies with connections to external power sources (typically 110 or 220 volt power lines).

Furthermore, as is apparent from above, the differential configuration is preferred in those situations where long bus lengths are required (for example, devices are to be connected by long bus cables). Often though, a device is provided with a bus of the single-ended configuration or a number of devices are already connected on a single-ended bus, and it is desired to connect another device at a large distance from the single-ended bus. In this case a bus converter must be provided. However, power must then be provided for the bus converter. The amount of power is not insignificant particularly where the converter must provide a differential bus operating with high powered transceivers. The conventional approach is to provide a converter device supported with a connection to a power outlet, such as 110/220 volt power connection. In complex SCSI network configurations with many devices, where one or more bus repeaters and/or converters may be required, this can lead to a more costly, unsafe, and unsightly, undesirable proliferation of power outlets and power cords. Further, in situations where the distance between devices is desired to exceed the maximum recommended lengths, a 110 or 220 volt power outlet may not even be available.

It would be desirable then if a bus regenerator, either a bus repeater but particularly a bus converter, could be provided for an SCSI or other information bus. Such a regenerator would desirably allow increased maximum bus lengths, preferably with conversion of the bus, without creating the need for additional power outlets and power cabling with their associated cost, clutter and safety concerns.

SUMMARY OF THE INVENTION

The present invention realizes that a bus regenerator can be readily and economically constructed for an SCSI or other information bus, which does not rely on additional external power connections. In particular, the invention realizes that in many cases the current required by circuitry in such a regenerator is relatively small, typically less than about 100 mA (and often less than 50 or 20 mA), and thus such a regenerator can obtain power from the TERMPWR line of the bus system without any significant affect on bus performance.

In addition though, the present invention further realizes that the voltage on the TERMPWR line varies depending upon bus configuration (for example, the number of peripheral devices and length of bus cables interconnecting them). Also, the current supplied from the termination power line may vary depending upon the information being transferred, as can be understood from FIGS. 1 and 2, further causing TERMPWR voltage fluctuations. The present invention then, further recognizes that voltage supplied from the TERMPWR line for use by the electronic components of the regenerator, should therefore preferably be regulated.

Additionally, the present invention recognizes that for regenerators which may have higher power consumption requirements, such as to power high powered differential transceivers, a TERMPWR line may not be able to continuously supply the necessary current without a serious drop in TERMPWR line voltage.

Accordingly, the present invention provides in one aspect, a bus regenerator, comprising:

first and second information buses;

a processor connected to transfer information between the buses;

at least one terminator connected to terminate one of the buses;

a termination power line connected to supply termination power to the terminator and power to the processor; and a rechargeable power source connected to the termination power line, so as to supply power to at least one of the terminator and the processor, and recharge from the termination power line, as total power used by the terminator and processor varies.

In another aspect of the present invention, an information bus regenerator is provided which comprises:

first and second bus sockets to releasably engage with respective mating socket members connected to information buses;

a processor connected to transfer information between the first and second bus sockets;

at least one terminator connected to one of the bus sockets to terminate an information bus connected thereto;

a termination power line connected to convey termination power between the first and second bus sockets and connected to supply termination power to the terminator and power to the processor from termination power received at one of the bus sockets; and a rechargeable power source connected to the termination power line, so as to supply power to at least one of the terminator and the processor, and recharge from the termination power line, as total power used by the terminator and the processor varies.

An extended information bus system is provided in a further aspect of the present invention, which comprises:

a) a host device and at least one peripheral device with respective information buses connected to first and second socket members respectively, at least one of the devices providing termination power to the corresponding socket member; and b) a bus regenerator comprising:

first and second bus sockets releasably engaged with respective mating socket members;

a processor connected to transfer information between the first and second bus sockets;

first and second terminators connected to respective bus sockets to terminate the information bus connected thereto;

a termination power line connected to convey termination power between the first and second bus sockets and to supply termination power to the terminators and power to the processor, from termination power received at one of the bus sockets from one of the host or peripheral device; and a rechargeable power source connected to the termination power line, so as to supply power to the terminators and the processor, and recharge from the termination power line, as total power used by the terminators and the processor varies.

In a further aspect of the present invention, there is provided a method of communicating information between a host device and at least one peripheral device, comprising:

a) supplying information signals on an information bus of at least one of the devices and supplying termination power from the host or peripheral device;

b) at a bus regenerator intermediate the two devices:

receiving and terminating the information bus using the termination power provided from the host or peripheral device;

using a processor to transfer the information from the bus of one device to a terminated information bus on the other device, the termination power from the host or peripheral device being used to provide power to the processor; and providing power to at the processor or terminators from a rechargeable power source connected to the termination power line, and recharging the rechargeable power source, as total power used by the terminator and the processor varies.

A bus regenerator of the present invention allows for increased maximum bus lengths without creating the need for additional power outlets and power cabling with their associated cost, clutter and safety concerns. This is true even when the regenerator is a bus convertor with higher power consumption requirements.

BRIEF DESCRIPTION OF THE DRAWING

Embodiments of the invention will now be described, in which.

For ease of understanding, like reference numerals have been used when possible to illustrate like components.

DETAILED DESCRIPTION OF THE INVENTION

Figure 3:
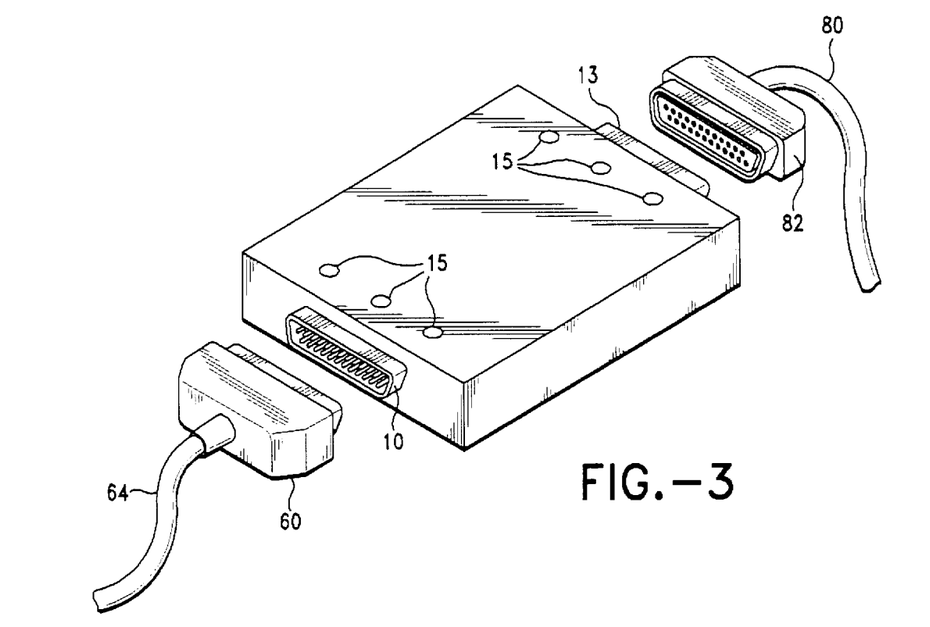
FIG. 3 is a perspective external view of a bus regenerator of the present invention.
Figure 4:
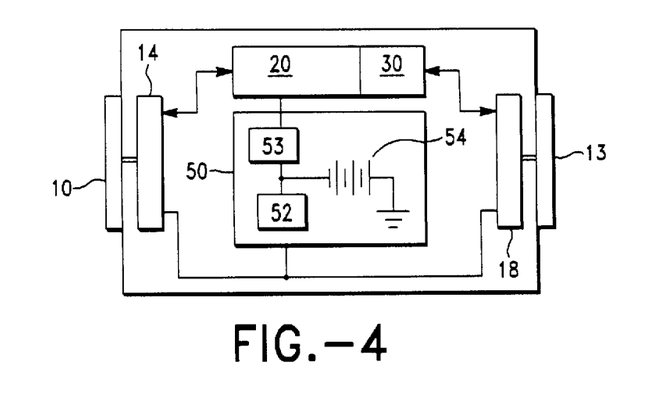
FIG. 4 is a block diagram showing the components of the bus regenerator of FIG. 3.
Figure 5:
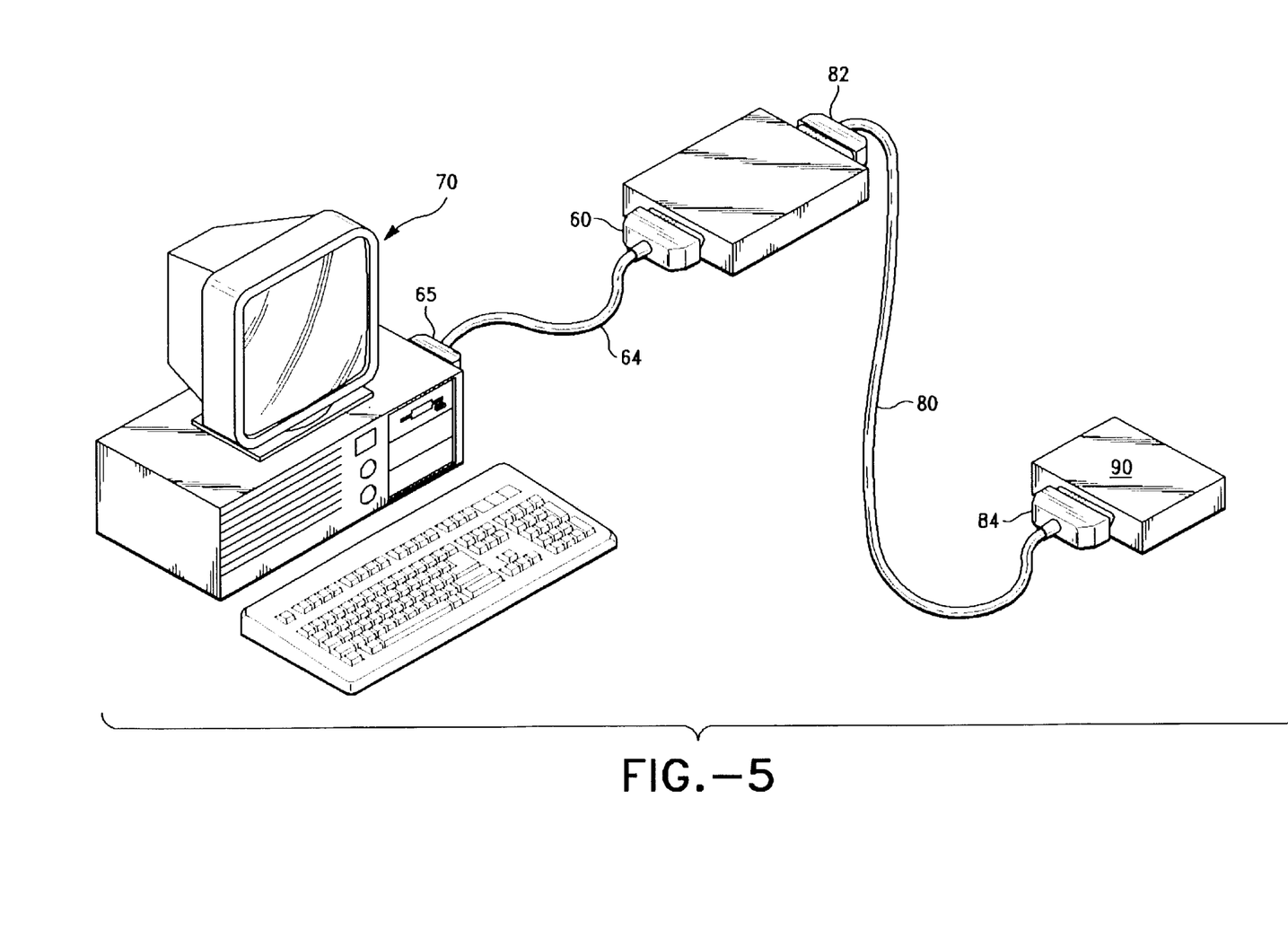
FIG. 5 illustrates a typical application of the bus regenerator of FIG. 3.
Figure 6A:
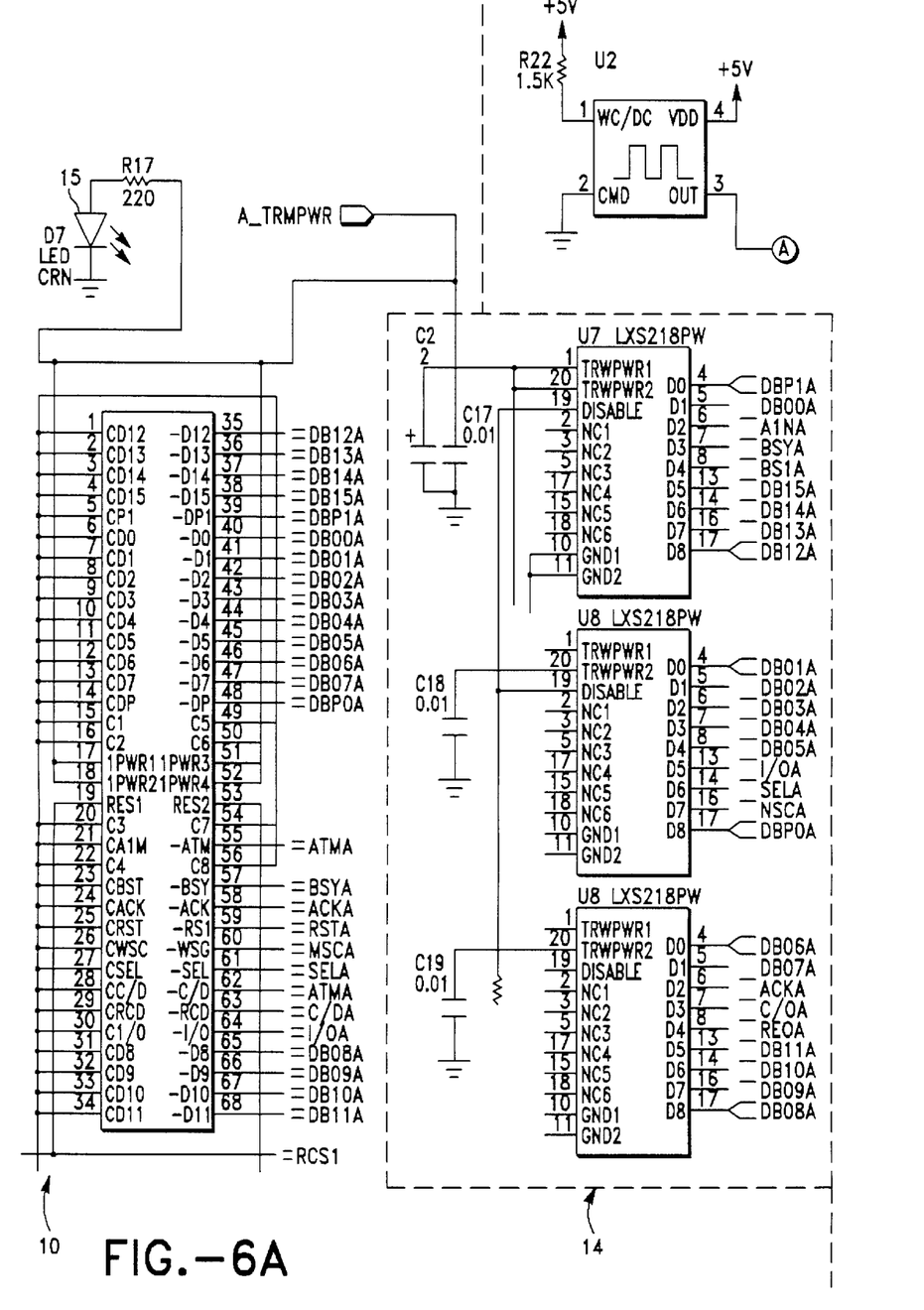
FIGS. 6–9 together are a schematic of the bus regenerator of FIGS. 3 and 4.
Figure 6B:
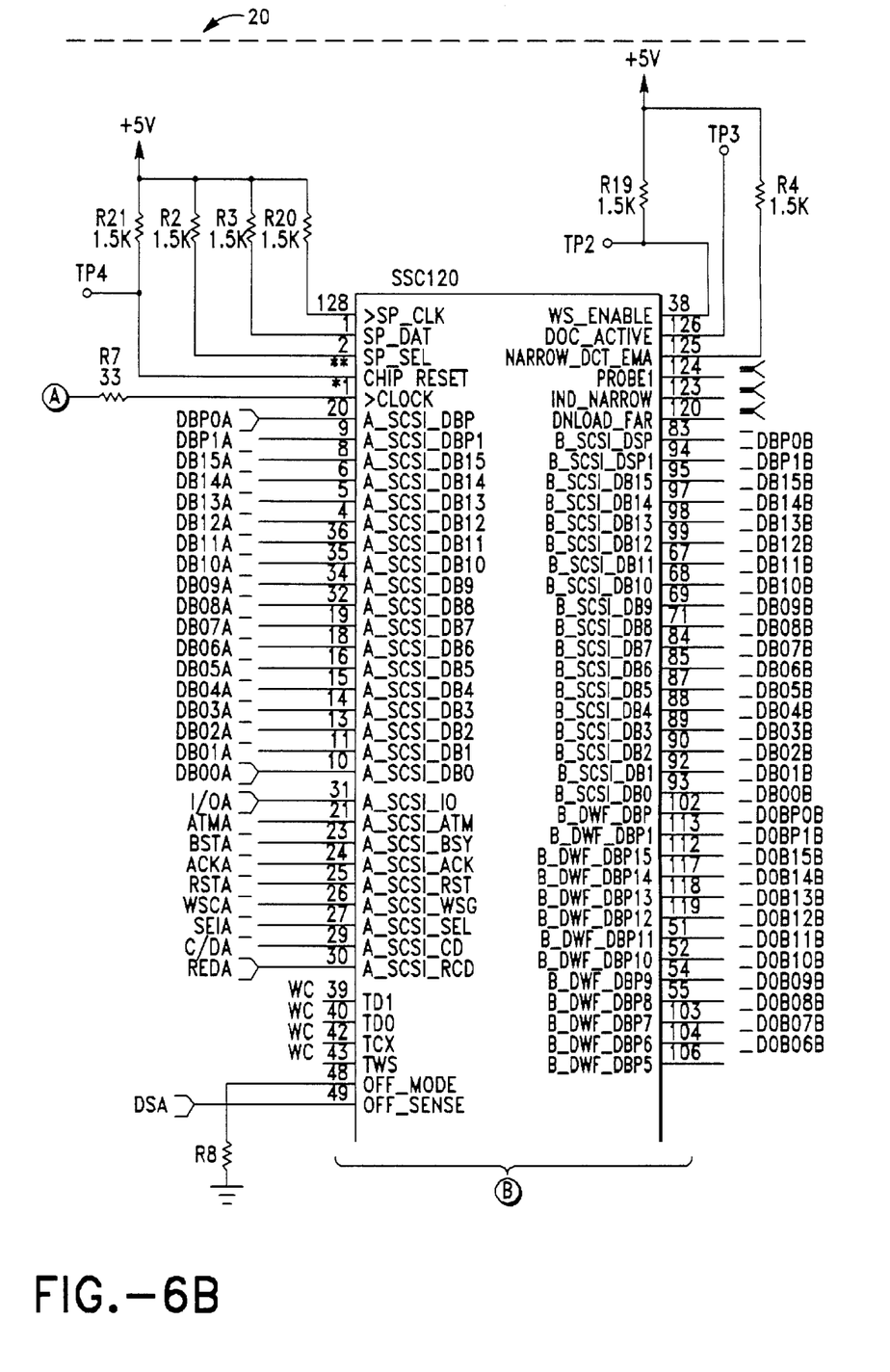
Figure 6C:
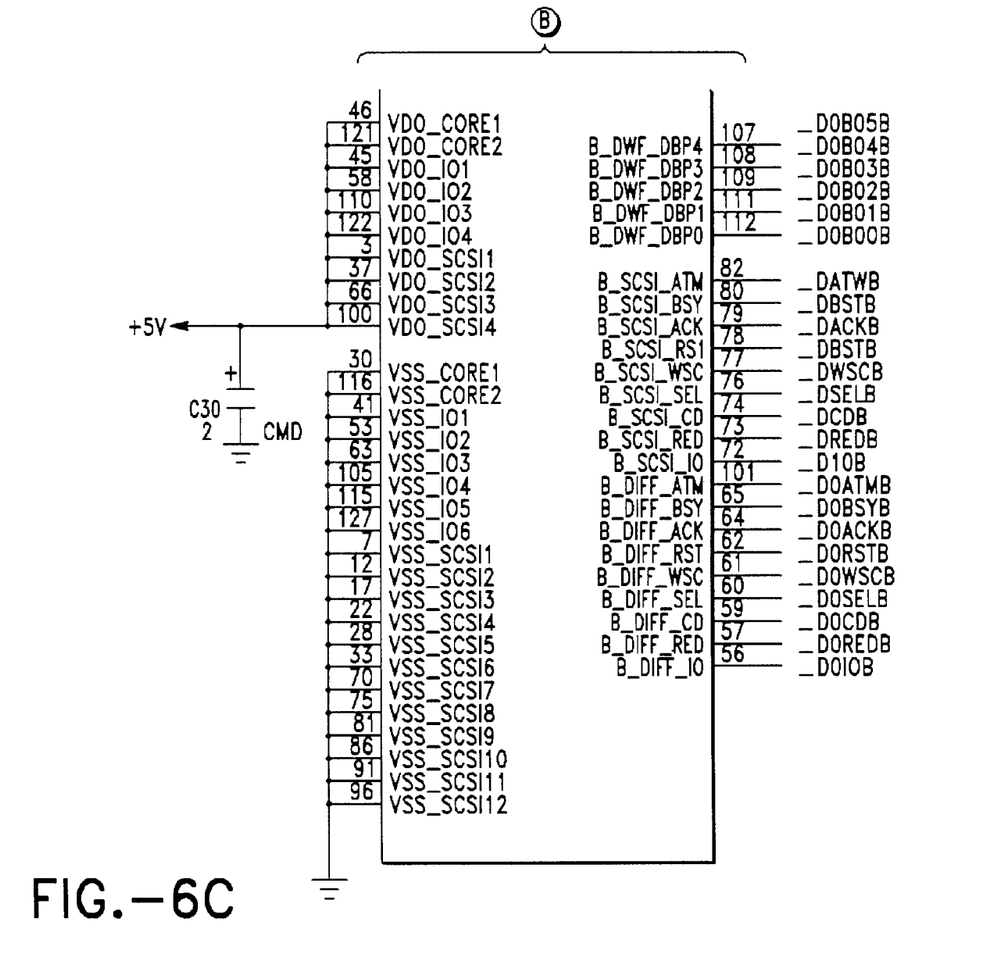
Figure 7A:
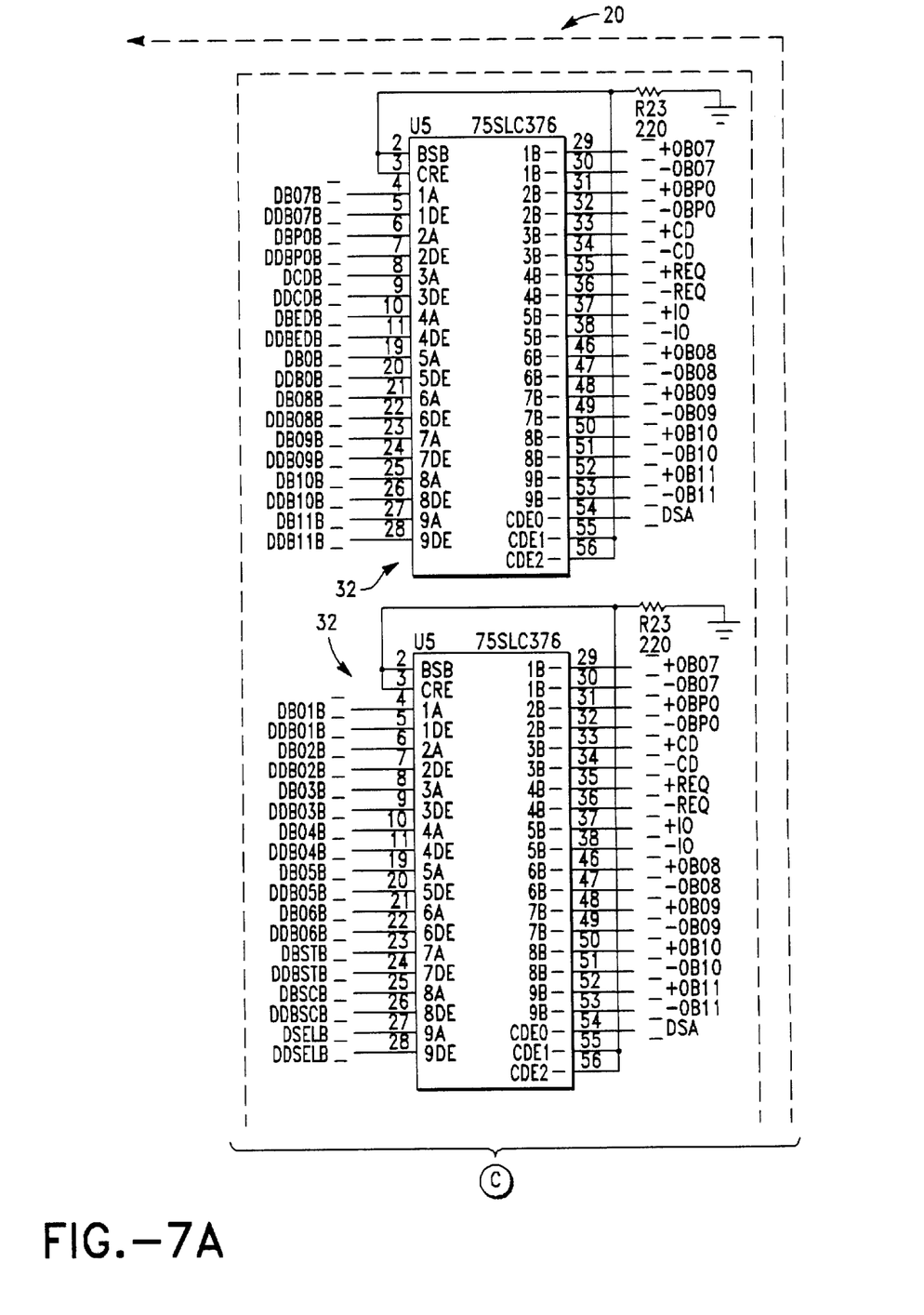
Figure 7B:
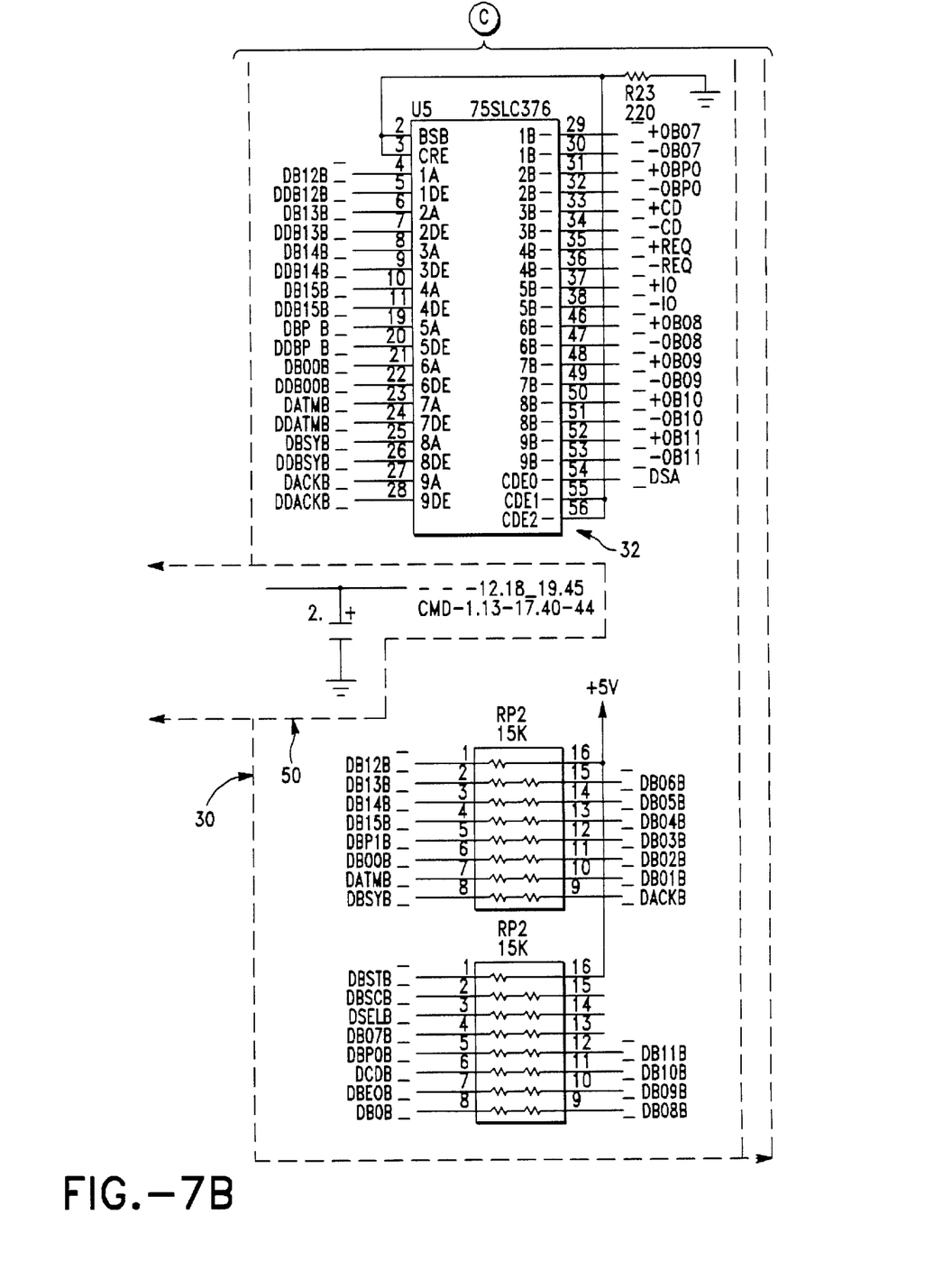
Figure 8A:
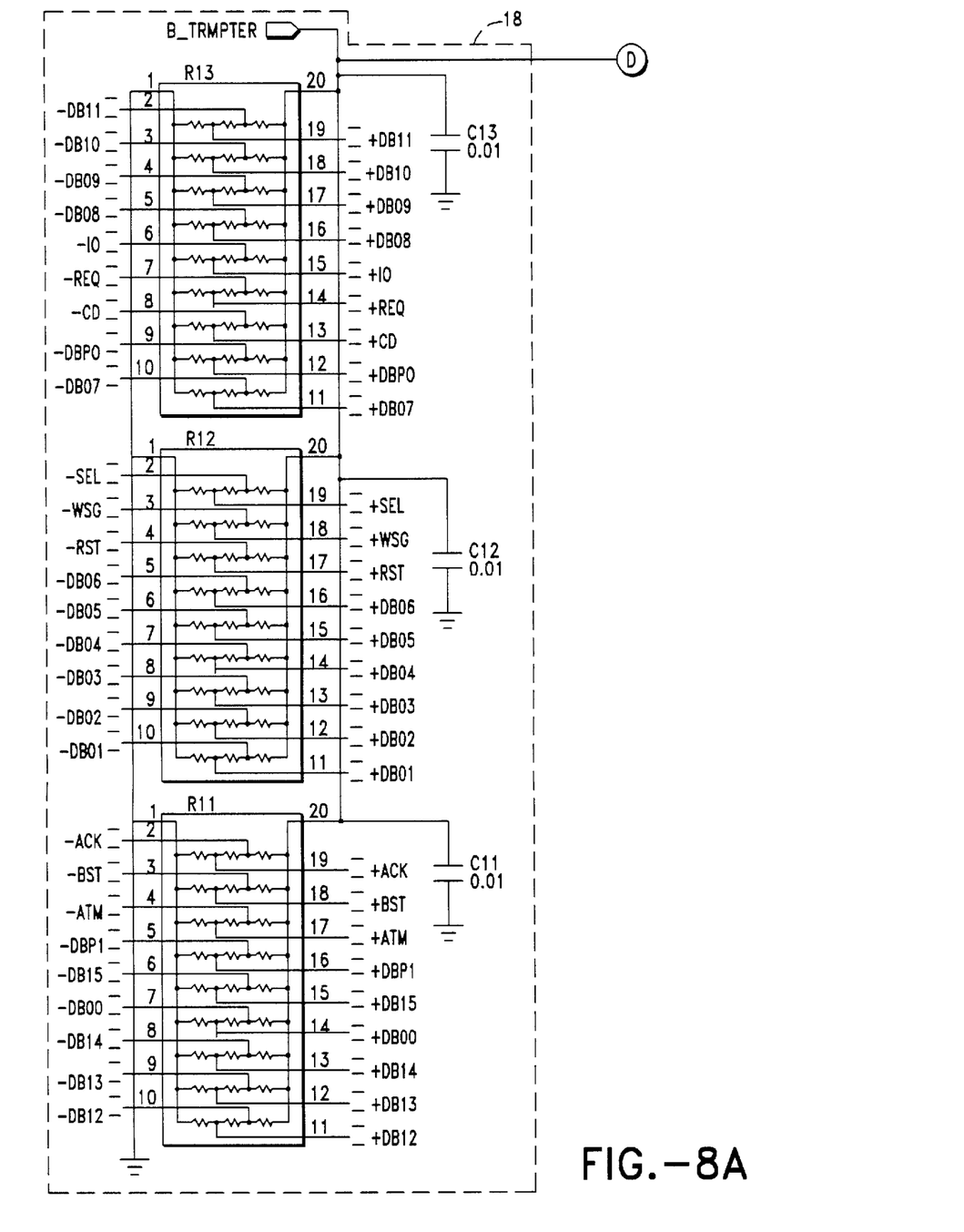
Figure 8B:
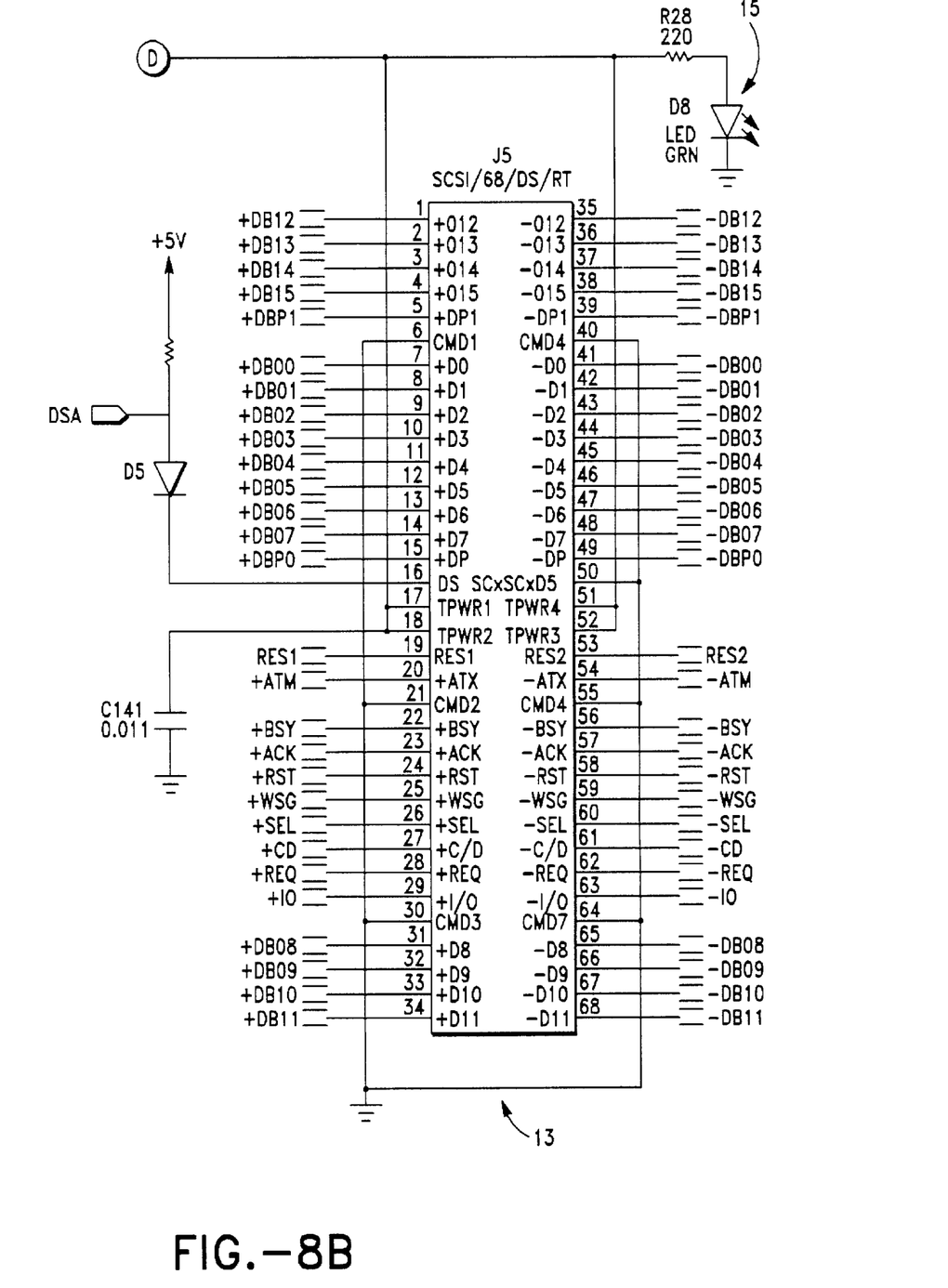
Figure 9:
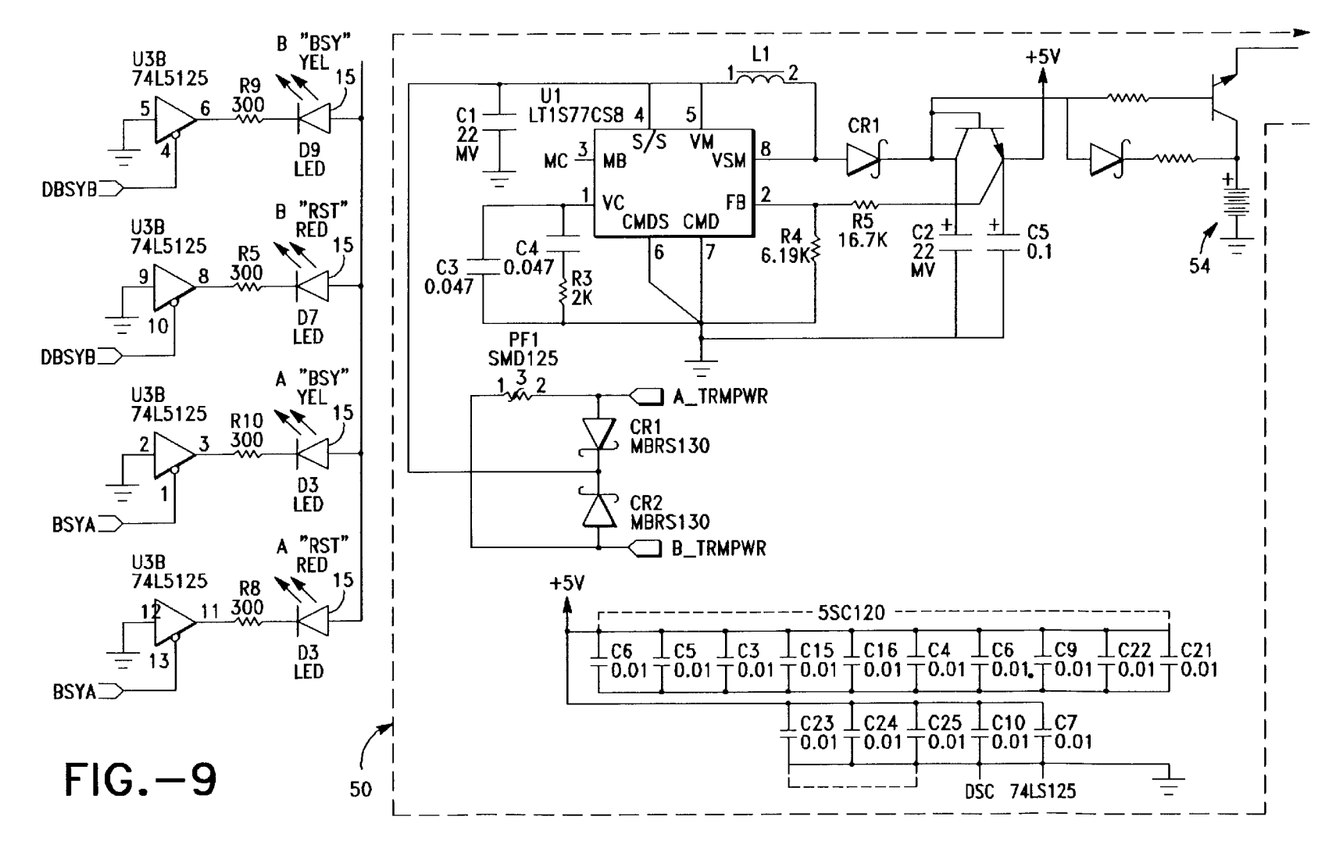

Referring in particular to FIGS. 3 and 4, the bus regenerator 6 shown has a housing 8 and two sockets 10 and 13 on opposite ends of housing 8, and status indicator light emitting diodes ("LEDs") 14. Sockets 10 and 13 are female sockets of identical 68 pin configuration for wide SCSI bus connection, with socket 13 being for connection to a differential SCSI bus, and therefore include pins connected to a number of data and control lines as well as at least one termination power line. Sockets 10 and 3 each can repetitively and releasably engage and disengage with mating male socket members 60 and 82, respectively, by manual insertion/removal in a known manner. Optional additional mating screw/threaded bore fasteners (not shown) can secure any one of sockets 10, 13 and its engaged mating socket member in the engaged position. An active terminator unit 14, and a passive terminator unit 18, both of known configuration, are connected to respective sockets 10 and 13 to terminate each of the data and control lines from a connected bus, in a known manner. Active terminator unit 14 includes three active terminator ICs, such as those made by Linfinity (Garden Grove, Calif.).

Internal of housing 8, a signal processor 20 is connected between sockets 10 and 13 to transfer data and control signals between them (all such signals together being generally referenced as "information signals" or the like). In the embodiment shown in FIGS. 3–9, signal processor 20 transfers data and control signals between sockets 10 and 13 while converting one bus format to another, in particular between single-ended and differential SCSI. Thus, the regenerator acts as a bus converter. However, it will be appreciated that signal processor 20 could act just as a bus repeater (that is, an information bus communicating with one socket is regenerated and repeated at the other socket in the same format), where the format of signals at different sockets would be the same (for example, both single-ended SCSI).

Signal processor 20 enhances information signals transferred between sockets 10 and 13 such as by re-timing and filtering. One suitable component which can be used in signal processor 20 is the SYM53C120 chip manufactured by Symbios Logic a subsidiary of Hyundai Electronics America. Additionally, signal processor 20 includes differential transceiver unit 30 comprised of three, nine line, differential transceivers 32 such as Part No. 75976A2DL sold by Texas Instruments, USA. Transceiver unit 30 together with the remainder of the components of signal processor 20, allow for conversion of signals between a differential SCSI format at socket 13, and single-sided format at socket 10.

A termination power line 40 is connected between the TRMPWR terminals of sockets 10 and 13 to transfer termination power supplied from an external device (usually the host device) which may be connected to one of sockets 10 and 13 to the external devices (usually a peripheral device) connected to the other two of sockets 10 and 13. Termination power line 40 is also connected to provide termination power to each of termination units 14, 18 as well as to signal processor 20 (including differential transceiver units 30) through a power supply 50. Power supply 50 incorporates a DC to DC inverter 52 as well as a voltage regulator 53, as seen particularly in FIGS. 4 and 9. The inverter steps up the voltage from termination power line 40 whenever termination line voltage drops below the preselected input value of about 5 volts. Inverter 52 can provide an output voltage of about 5 volts. Power supply 50 further includes a voltage regulator 53 set to provide a constant output voltage of about 5 volts to processor 20. This, in most cases, will ensure that the required constant voltage is provided for proper functioning of processor 20. It will be seen from the foregoing arrangement then, that termination power line 40 supplies termination power both to the terminators 14, 18 and to processor 20, from termination power received at one of the bus sockets 10 and 13 from a connected host or peripheral device.

Power supply 50 further includes a rechargeable power source in the form of rechargeable battery 54 also connected to receive power from inverter 52 and supply it, when required, to the input of voltage regulator 53. By arranging battery 54 to receive power from inverter 52, this ensures that there is a sufficiently high voltage to charge battery 54. Rechargeable battery 54 can be any suitable rechargeable electrochemical battery, such as a four cell nickel-cadmium, nickel-metal hydride, or the like. The purpose of battery pack 54 can be understood as follows. During operation each of three nine-line differential transceivers 32 of transceiver unit 30, can require a peak current of up to 24 mA (at about 5 V) or more, the current depending upon the information on the bus. This makes for a maximum total peak current requirement for transceiver unit 30 of up to about 1 Amp (although this might be as high as 2 Amp). This together with the current required for terminators 14 and 18 may cause the TERMPWR at regenerator 6 and at the host devices, to drop below satisfactory operating limits depending upon the information on the bus. However, rechargeable battery 54 provides the necessary additional power during peak loads of transceiver 30, and is recharged from the termination power line, as total power used by terminators 14, 18 and signal processor 20 varies. In situations where the peak current requirements for transceiver 30 are not as high, rechargeable battery 54 might be replaced by a suitable capacitor bank (such as a bank of more than 2000 or even more than 3000 microfarads).

In operation, regenerator 6 shown in the drawing, is connected to a single-ended SCSI bus devices by manually inserting mating plugs 60 on the end of bus cable 64, into socket 10. Similarly, plug 82 of cable 80 can be manually and removably inserted into socket 13 to connect differential bus device 90. Each of cables 64, 80 can be up to the maximum recommended length. The other ends of cables 64, 80 have respective removable plugs 65, 84 which are removably engaged in mating socket members connected to respective information buses of devices 70, 90. In an alternate arrangement, socket 10, can be plugged directly into a mating socket member on device 70, or socket 13 can be plugged directly into a mating socket member on device 90. In a still further arrangement plugs 60 and 82 could be dispensed with (the bus cables 64 and 80 being fixedly connected within housing 8), in which case plugs 65 and 84 can be regarded as the socket members of bus regenerator 6 (it being understood in this application that "socket" and "plug" are generally used interchangeably, so that either one may be male or female). In any event, the resulting system may be referenced as an extended information bus system.

In the above system then, the buses of each device 70 and 90 are terminated at respective terminators 14 and 18 of regenerator 6, and information signals from either device are enhanced by processor 20 and delivered on a regenerated bus to the other device either with or without format conversion. Termination power is supplied by the host device (such as device 70) through the TERMPWR line of cable 64, through termination power line 40 of regenerator 6, and to the other device 90. Termination power provided from the device 70 is used for termination power at a terminator (not shown) on the device 90. Furthermore, the same termination power is used to terminate all information buses at terminators 14 and 18 of regenerator 6 as well as to provide power to processor 20 through power supply 50 and the DC to DC inverter therein. Rechargeable battery 54 provides the necessary additional power through voltage regulator 53 during peak loads at processor 20 (in particular at transceiver 30), and is recharged from the termination power line, through inverter 52 as total power used by terminators 14 and 18 and signal processor 20 varies.

It will be seen then, that an information bus can be extended (including regeneration or conversion) with regenerator 6 at a position intermediate devices 70 and 90 without the need for providing an external power supply connection (such as for 110 volt operated supply) at the intermediate location of regenerator 6. When configurations of peripherals employing multiple regenerators 6 are assembled, this can eliminate the need for additional costly, unsightly and unsafe, cumbersome wiring installations.

It will be understood that modifications and variations to the above described embodiments of the invention are, of course, possible. Accordingly, the present invention is not limited to such specific embodiments.

What is claimed is:

1. A bus regenerator, comprising:

first and second information buses;

a processor connected to transfer information between the buses;

at least one terminator connected to terminate one of the buses;

a termination power line connected to supply termination power to the terminator and power to the processor; and a rechargeable power source connected to the termination power line, so as to supply power to at least one of the terminator and the processor, and recharge from the termination power line, as total power used by the terminator and processor varies.

2. A regenerator according to claim 1, wherein the rechargeable power source includes a rechargeable battery.

3. A regenerator according to claim 2, wherein the rechargeable power source comprises a DC to DC inverter which steps up the DC voltage between the termination power line and the processor.

4. A regenerator according to claim 1, wherein the rechargeable power source includes a capacitor bank of greater than 2000 microfarads.

5. A regenerator according to claim 1, wherein a corresponding terminator is connected to each of the input and output sockets, and wherein the termination power line is connected to supply power to both terminators.

6. A regenerator according to claim 1, wherein each of the information buses is an SCSI I or SCSI II bus.

7. A regenerator according to claim 1, additionally comprising a voltage regulator between the termination power line and the processor.

8. An information bus regenerator, comprising:
   first and second bus sockets to releasably engage with respective mating socket members connected to information buses;
   a processor connected to transfer information between the first and second bus sockets;
   at least one terminator connected to one of the bus sockets to terminate an information bus connected thereto;
   a termination power line connected to convey termination power between the first and second bus sockets and connected to supply termination power to the terminator and power to the processor from termination power received at one of the bus sockets; and
   a rechargeable power source connected to the termination power line, so as to supply power to at least one of the terminator and the processor, and recharge from the termination power line, as total power used by the terminator and the processor varies.

9. A regenerator according to claim 8, wherein the rechargeable power source includes a rechargeable battery.

10. A regenerator according to claim 9, wherein the power source additionally comprises a voltage regulator with an output connected to the processor, and a DC to DC inverter connected between the termination power line and an input of the voltage regulator;
    wherein the rechargeable battery is connected to receive power from the inverter and provide it to the regulator.

11. A regenerator according to claim 10, wherein the DC to DC inverter steps up the DC voltage from the termination power line when the termination power line voltage falls below a preselected processor input voltage.

12. A regenerator according to claim 8, wherein a corresponding terminator is connected to each of the input and output sockets, and the termination power line is connected to supply termination power to both of the terminators from termination power received at one of the sockets.

13. A regenerator according to claim 8, wherein the rechargeable power source additionally comprises a voltage regulator between the termination power line and the processor.

14. A regenerator according to claim 8, wherein the processor enhances information signals transferred between the sockets.

15. A regenerator according to claim 8, wherein the processor transfers information between the first and second sockets in the same format so that the regenerator acts as a bus repeater.

16. A regenerator according to claim 8, wherein the processor transfers information between the first and second sockets in different formats so that the regenerator acts as a bus converter.

17. A regenerator according to claim 16, wherein the processor transfers information from a single-ended format at one socket, to a differential format at the other socket, and wherein the processor includes a differential transceiver unit.

18. An extended information bus system, comprising:
    a) a host device and at least one peripheral device with respective information buses connected to first and second socket members respectively, at least one of the devices providing termination power to the corresponding socket member; and
    b) a bus regenerator comprising:
       first and second bus sockets releasably engaged with respective mating socket members;
       a processor connected to transfer information between the first and second bus sockets;
       first and second terminators connected to respective bus sockets to terminate the information bus connected thereto;
       a termination power line connected to convey termination power between the first and second bus sockets and to supply termination power to the terminators and power to the processor, from termination power received at one of the bus sockets from one of the host or peripheral device; and
       a rechargeable power source connected to the termination power line, so as to supply power to the terminators and the processor, and recharge from the termination power line, as total power used by the terminators and the processor varies.

19. An extended information bus system according to claim 18, wherein the rechargeable power source comprises a rechargeable battery.

20. An extended information bus system according to claim 18, wherein the rechargeable power source additionally comprises a voltage regulator with an output connected the processor, and a DC to DC inverter which steps up the DC voltage between the termination power line and the voltage regulator when the termination power voltage received from the host or peripheral device falls below a preselected voltage.

21. An extended information bus system according to claim 18, wherein the bus regenerator includes an input port and an output port, the processor enhances information signals transferred from the input port to the output port.

22. An extended information bus system according to claim 18, wherein the processor transfers information between the first and second sockets in the same format so that the regenerator acts as a bus repeater.

23. An extended information bus system according to claim 22, wherein the input and output sockets have multiple terminals, the terminal configuration of the sockets being the same.

24. An extended information bus system according to claim 18, wherein the processor transfers information between the first and second sockets in different formats so that the regenerator acts as a bus converter.

25. An extended information bus system according to claim 18, wherein the processor transfers information from a single-ended format at one socket, to a differential format at the other socket, and wherein the processor includes a differential transceiver unit.

26. A method of communicating information between a host device and at least one peripheral device, comprising:
    a) supplying information signals on an information bus of at least one of the devices and supplying termination power from the host or peripheral device;

b) at a bus regenerator intermediate the two devices:
   receiving and terminating the information bus using the termination power provided from the host or peripheral device;
   using a processor to transfer the information from the bus of one device to a terminated information bus on the other device, the termination power from the host or peripheral device being used to provide power to the processor; and
   providing power to at the processor or terminators from a rechargeable power source connected to the termination power line, and recharging the rechargeable power source from the termination power line, as total power used by the terminator and the processor varies.

27. A method according to claim 26, wherein the rechargeable power source comprises a rechargeable battery.

28. A method according to claim 26 additionally comprising, at the bus regenerator, regulating the voltage supplied from the termination power line to the processor.

29. A method according to claim 28 additionally comprising, at the regenerator, using a DC to DC inverter to step up the DC voltage between the termination power line and the processor when the termination power line voltage falls below a preselected voltage.

30. A method according to claim 26, wherein the processor enhances transferred information signals.

31. A method according to claim 26, wherein the information transferred by the processor is retained in the same format so that the regenerator acts as a bus repeater.

32. A method according to claim 26, wherein the information transferred by the processor is converted in format so that the regenerator acts as a bus converter.

33. A method according to claim 32, wherein the processor transfers information from a single-ended format at one socket, to a differential format at the other socket, and wherein the processor includes a differential transceiver unit.

* * * * *